R. VON STEIGER.
PRESS FOR THE MANUFACTURE OF GOODS MADE FROM PASTE, DOUGH, AND THE LIKE.
APPLICATION FILED DEC. 28, 1921.

1,434,935.  Patented Nov. 7, 1922.

Inventor:
Robert von Steiger,
By Henry Orth
Atty.

Patented Nov. 7, 1922.

1,434,935

UNITED STATES PATENT OFFICE.

ROBERT VON STEIGER, OF ROSENBERG, NIEDERUZWIL, SWITZERLAND, ASSIGNOR TO THE FIRM: GEBRÜDER BÜHLER, OF UZWIL, SWITZERLAND.

PRESS FOR THE MANUFACTURE OF GOODS MADE FROM PASTE, DOUGH, AND THE LIKE.

Application filed December 28, 1921. Serial No. 525,432.

*To all whom it may concern:*

Be it known that I, ROBERT VON STEIGER, a citizen of the Republic of Switzerland, residing at Rosenberg, Niederuzwil, Switzerland, have invented a certain new and useful Improvement in Presses for the Manufacture of Goods Made from Paste, Dough, and the like, of which the following is a specification, reference being had therein to the accompanying drawing.

The invention relates to a press for the manufacture of goods made from paste, dough and the like, in which the material to be shaped is placed into a chamber and is subjected to pressure from a plunger and squeezed through apertures. Presses of this type are known in which an intermediate piece is interposed between the pressure chamber and the plate containing the mould apertures. When the pressure chamber is swung out of its operative position a layer of the material remains above the mould disc in said intermediate piece whereby a rupture of the goods is prevented when the pressure chamber is swung into its inoperative position.

According to the present invention this intermediate piece is broadened towards the mould disc and is so constructed and held in operative position that a certain amount of movement in the axial direction relatively to other parts of the press is permitted and that by the action of the reaction or back pressure of the dough under pressure said intermediate piece is caused to abut against stop means rigidly connected to other parts of the press and is thus secured in position. This construction permits of utilizing a large moulding disc and of attaining therefore a large output and of an easy and quick exchange of the mould disc.

Figure 1:
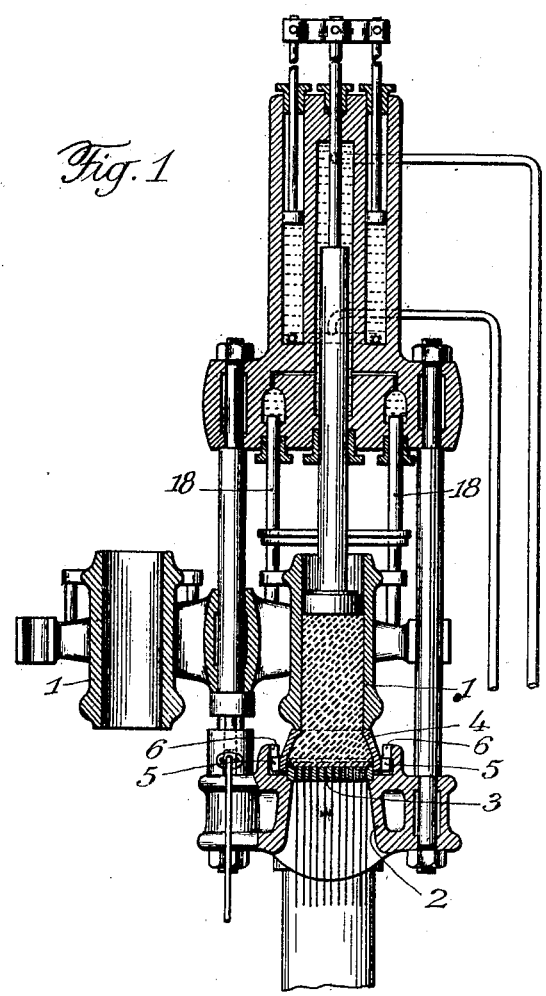

Several embodiments of the invention are shown by way of example in the accompanying drawing, in which:

Fig. 1 is a vertical section through a press provided with the enlarged intermediate piece and Figs. 2 to 6 illustrate detail modifications of the connection between the intermediate piece and parts of the press.

Referring to the press shown in Fig. 1, 1 denotes the swingably arranged pressure chamber, 2 is the base or press-table into which the moulding disc 3 is inserted and 4 denotes the intermediate piece. The latter is broadened i. e. its cross-section increases towards the disc and is so constructed that it can move somewhat relatively to the disc in the axial direction. At its outer periphery the intermediate piece 4 is provided with projecting parts 5 which form in conjunction with stop lugs 6 of the press table a bayonet joint. When the intermediate piece 4 has to be brought in position the latter is so turned that the projections 5 pass through the interstices between the stop lugs 6 and is then lowered so far that the upper faces of the projections 5 are below the lower faces of the stop lugs 6. Thereupon the piece 4 is turned until after the projections 5 and the stop lugs 6 coincide. If now the pressure chamber and the intermediate piece are filled with dough and pressure is applied to the latter the reaction or back pressure of the dough lifts the intermediate piece and presses the projections 5 against the stop lugs 6 and rigidly secures the piece in this position. When the application of the pressure ceases the reaction pressure ceases as well and the intermediate piece may easily be removed when for instance the mould disc has to be exchanged.

Figure 2:
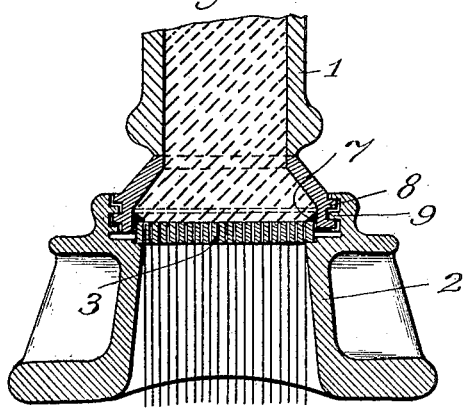

The connection between the intermediate piece 4 and other parts of the press may be modified in many ways. Instead of the bayonet joint a screw joint may be used as is shown in Fig. 2, which screw joint is provided with a clearance between the screw threads 8 of the intermediate piece and the screw threads 9 of the base.

Figure 3:
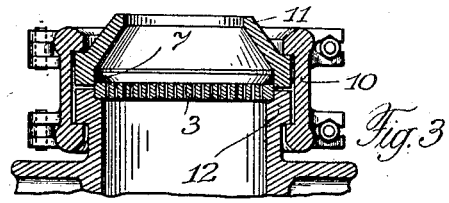
Figure 4:
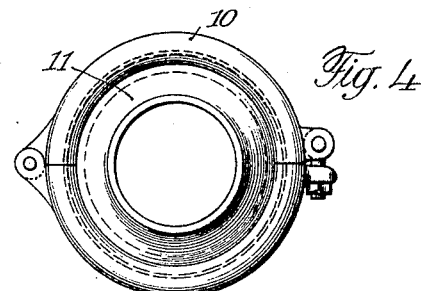

According to the construction illustrated in Figs. 3 and 4 a bipartite ring 10 may be utilized, provided with internal flanges that project over the intermediate piece 11 and over a collar 12 provided on the press table or base in order to effect this connection.

Figure 5:
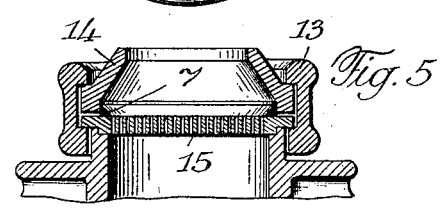

According to Fig. 5 the ring 13 may project over the intermediate piece 14 and over the moulding disc 15 instead of over intermediate piece and over the base as is shown in Fig. 3.

With all the constructional examples shown it is essential that, when no pressure is exerted by the press plunger, the intermediate piece is free to move somewhat relatively to the other parts of the press and that only after the reaction pressure of the dough acts on said piece the latter is pressed against stop means which are fixed to other parts of the press.

In order to provide for a free movement that is not hindered it is advantageous in such cases in which the intermediate piece projects over the mould disc to provide for some clearance between the inside diameter of the intermediate piece and the outside diameter of the mould disc. In order to prevent the dough from escaping through the annular gap present in this case and in the case in which the intermediate piece and the mould disc abut against each other in the manner shown in Fig. 5, it is advantageous to insert a tightening ring 7 which can be designed in a known manner like the expanding tightening rings on pistons of steam engines or the like.

Figure 6:
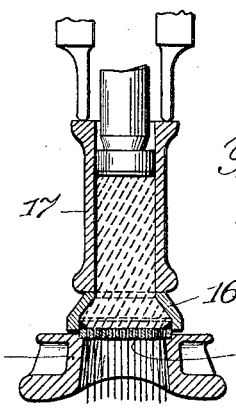

An especially advantageous way of attaching the intermediate pieces is illustrated in Fig. 6. In this constructional example the stop means against which the intermediate piece is pressed by the reaction pressure of the dough is formed by the lower edge of the pressure chamber. In this manner the intermediate piece is not only secured but the gap between the intermediate piece 16 and the pressure chamber 17 is closed. Thereby other constructional parts of the press such as the cylinders and pistons 18 (Fig. 1) adapted to press the pressure chamber against the intermediate piece during the working of the press in order to prevent an escape of the dough between the intermediate piece and the pressure chamber are dispensed with. The means for actuating the press are known as such and the press may be worked in the manner described in my copending application Ser. No. 498,707.

I claim:

1. In a press of the type described, a pressure chamber adapted to take up the material to be expressed, a mould disc, an intermediate piece interposed between said pressure chamber and said mould disc and having a cross-section that increases towards the mould disc, means adapted to hold said intermediate piece in operative position which means permit of a small movement of the intermediate piece in the axial direction, and stop means on the press against which said intermediate piece is caused to abut by the reaction pressure of the material under pressure acting on the intermediate piece.

2. In a press of the type described, a pressure chamber adapted to take up the material to be expressed, a mould disc, an intermediate piece interposed between said pressure chamber and said mould disc and having a cross-section that increases towards the mould disc, means adapted to hold said intermediate piece in operative position which means permit of a small movement of the intermediate piece in the axial direction, stop means on the press against which said intermediate piece is caused to abut by the reaction pressure of the material under pressure acting on the intermediate piece, and means adapted to prevent an escape of the compressed material between the intermediate piece and the mould disc.

3. In a press of the type described, a pressure chamber adapted to take up the material to be expressed, a mould disc, an intermediate piece interposed between said pressure chamber and said mould disc and having a cross-section that increases towards the mould disc, means adapted to hold said intermediate piece in operative position which means permit of a small movement of the intermediate piece in the axial direction, stop means on the press against which said intermediate piece is caused to abut by the reaction pressure of the material under pressure acting on the intermediate piece, and an expanding ring in contact with said intermediate piece and said mould disc for preventing an escape of the compressed material between said parts.

4. In a press of the type described, a pressure chamber adapted to take up the material to be expressed, a mould disc, an intermediate piece interposed between said pressure chamber and said mould disc and having a cross-section that increases towards the mould disc, means adapted to hold said intermediate piece in operative position and permit of a small movement of the intermediate piece in the axial direction, a facing on the lower edge of the pressure chamber, and a facing on the upper edge of the intermediate piece abutting against said facing on the pressure chamber by the reaction pressure of the material under pressure.

In testimony whereof I affix my signature.

ROBERT von STEIGER.